Oct. 15, 1957     F. C. WALTHER ET AL     2,809,690
PIVOTED SEAT
Filed Jan. 19, 1954     6 Sheets-Sheet 6
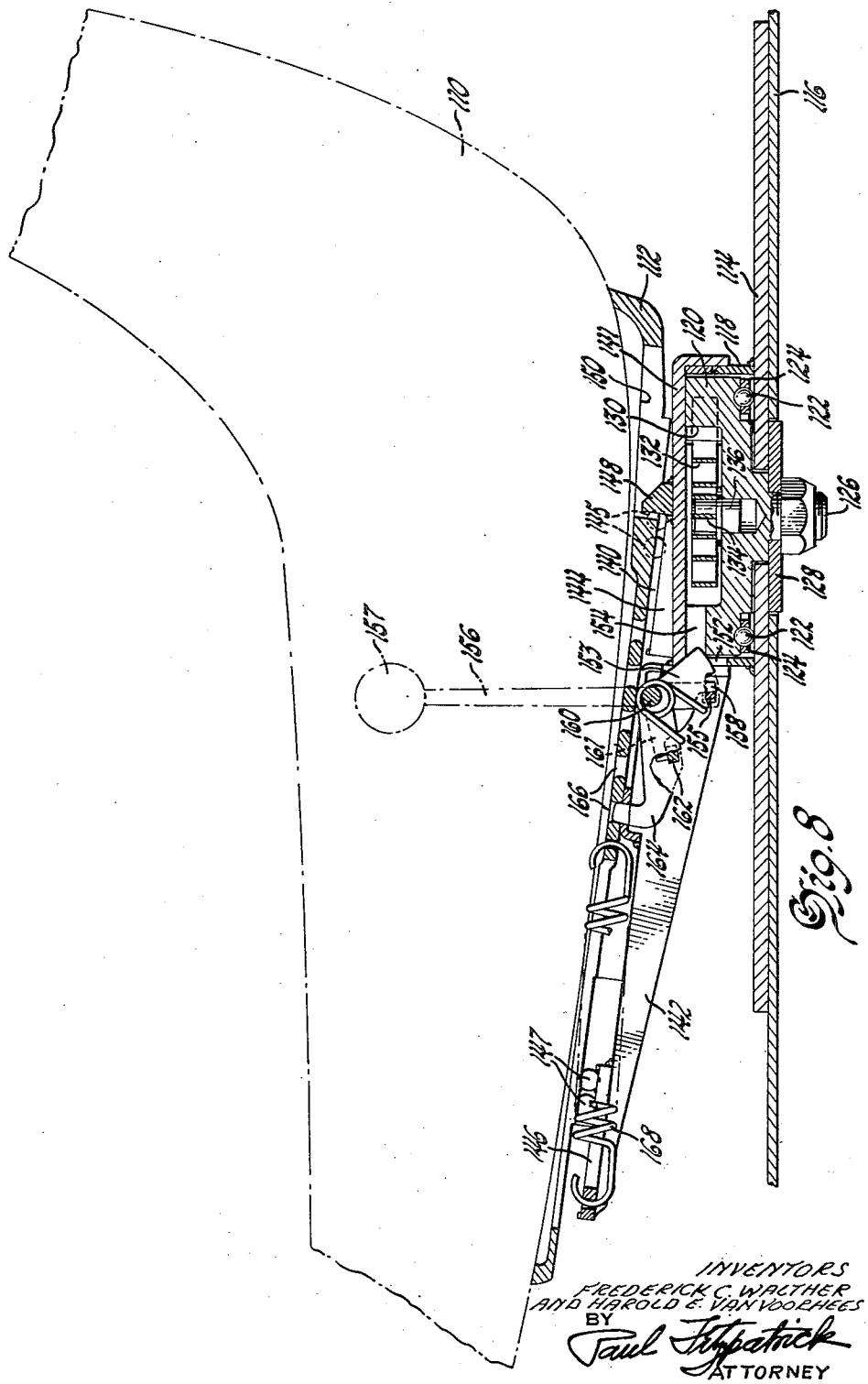

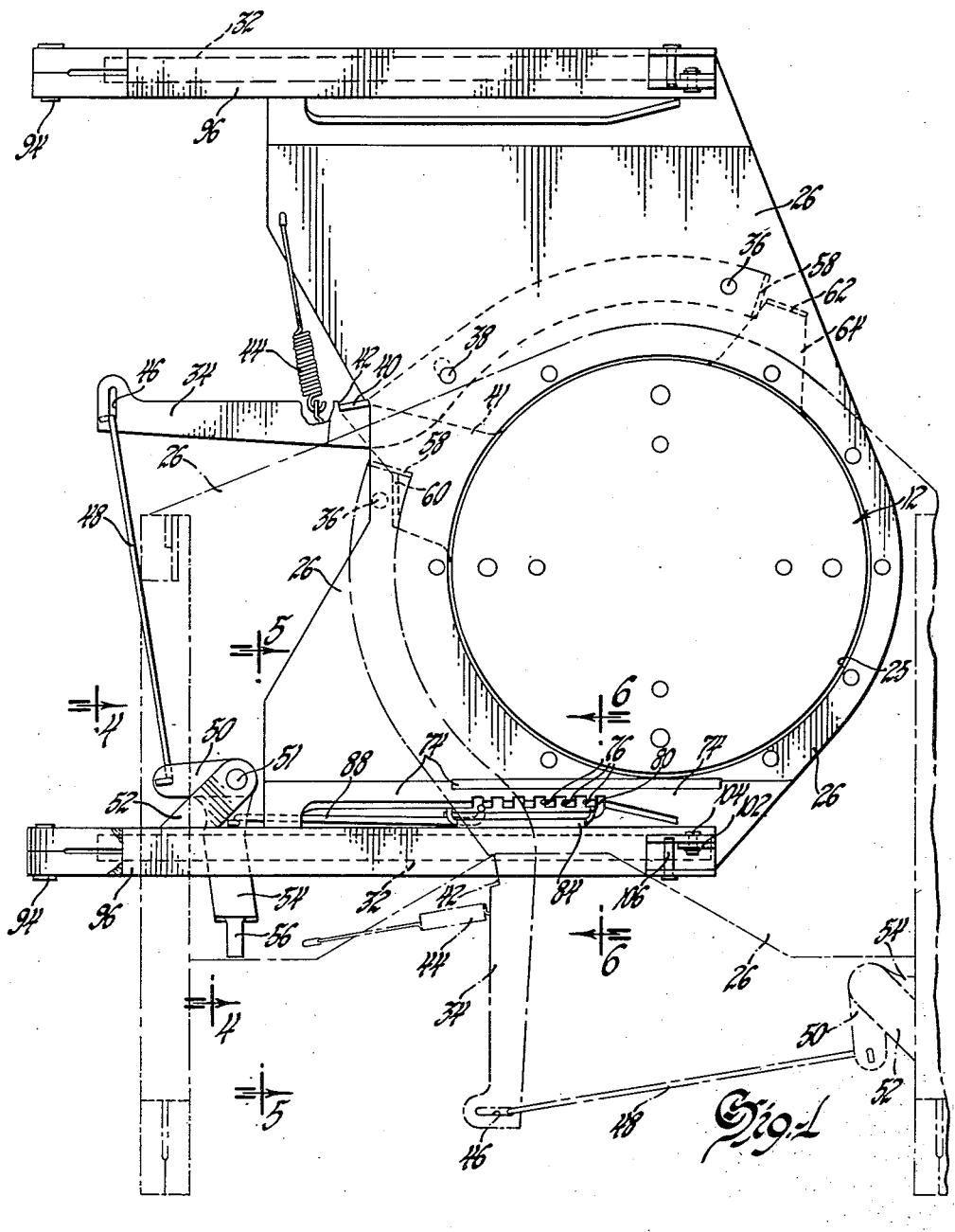

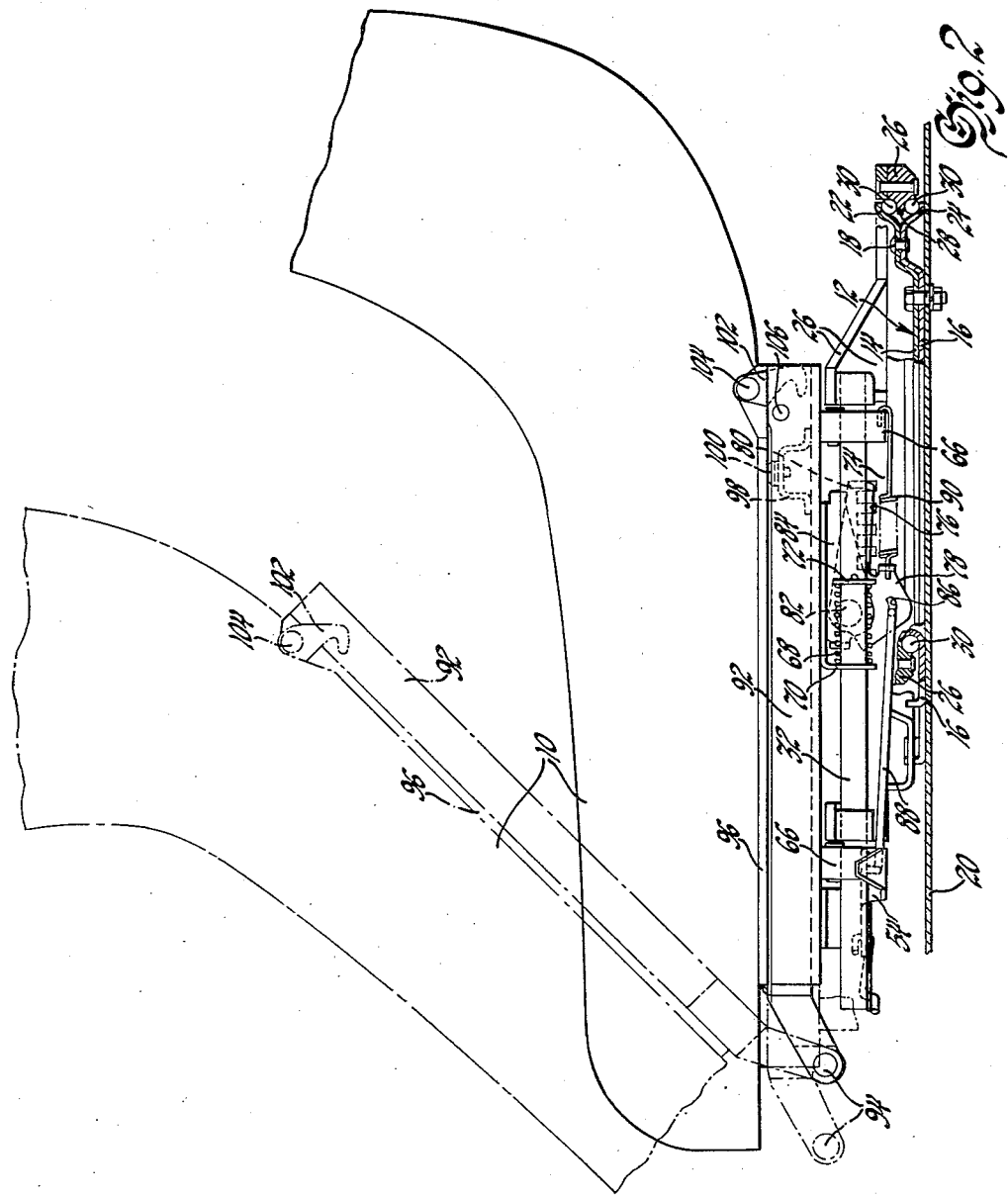

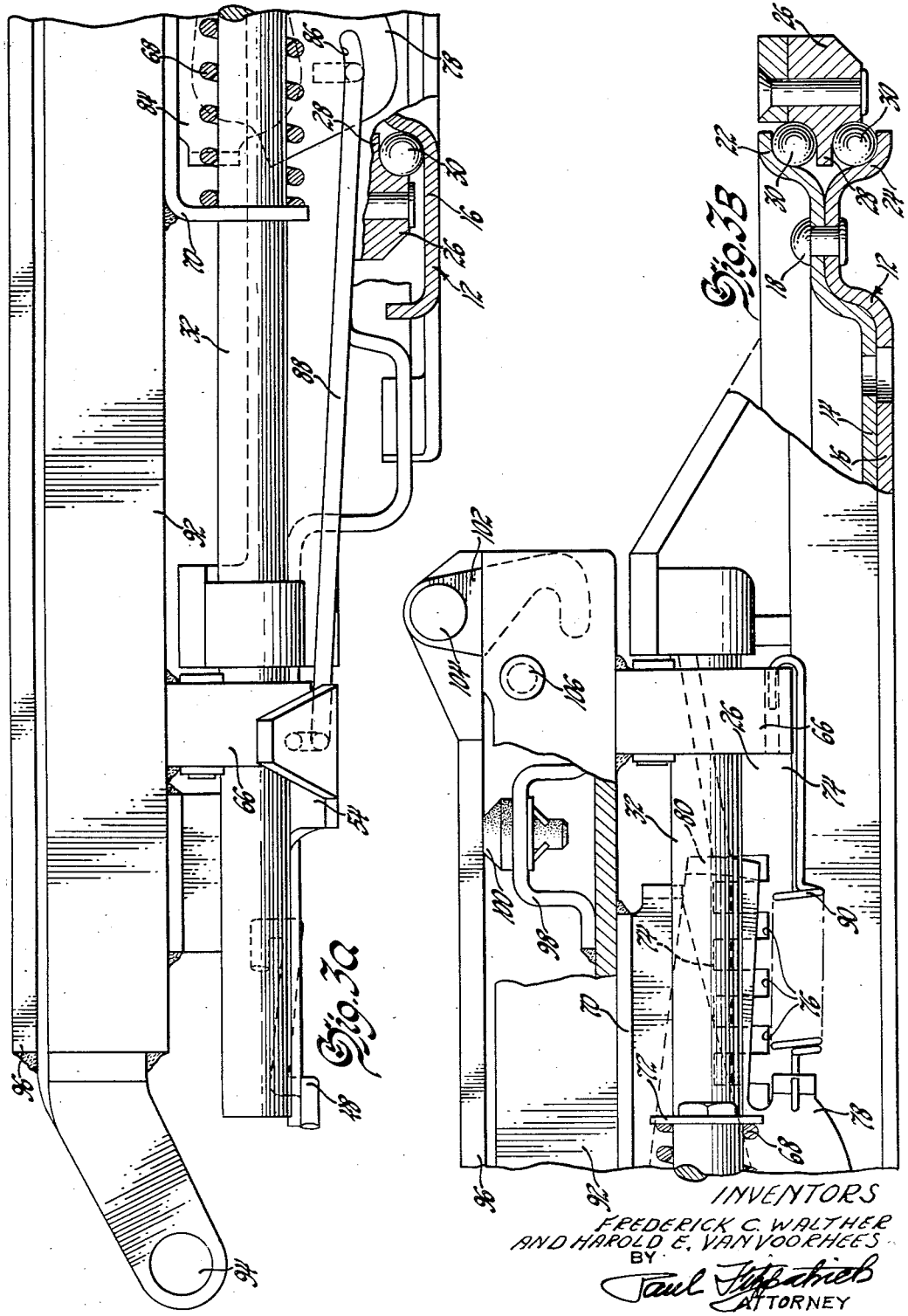

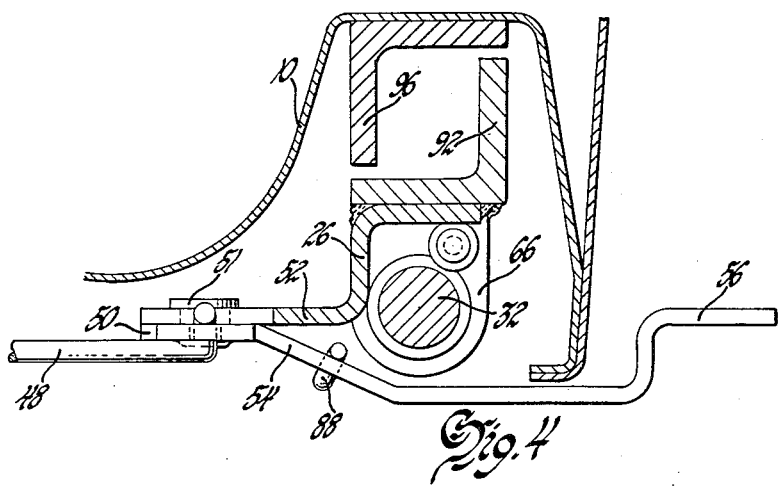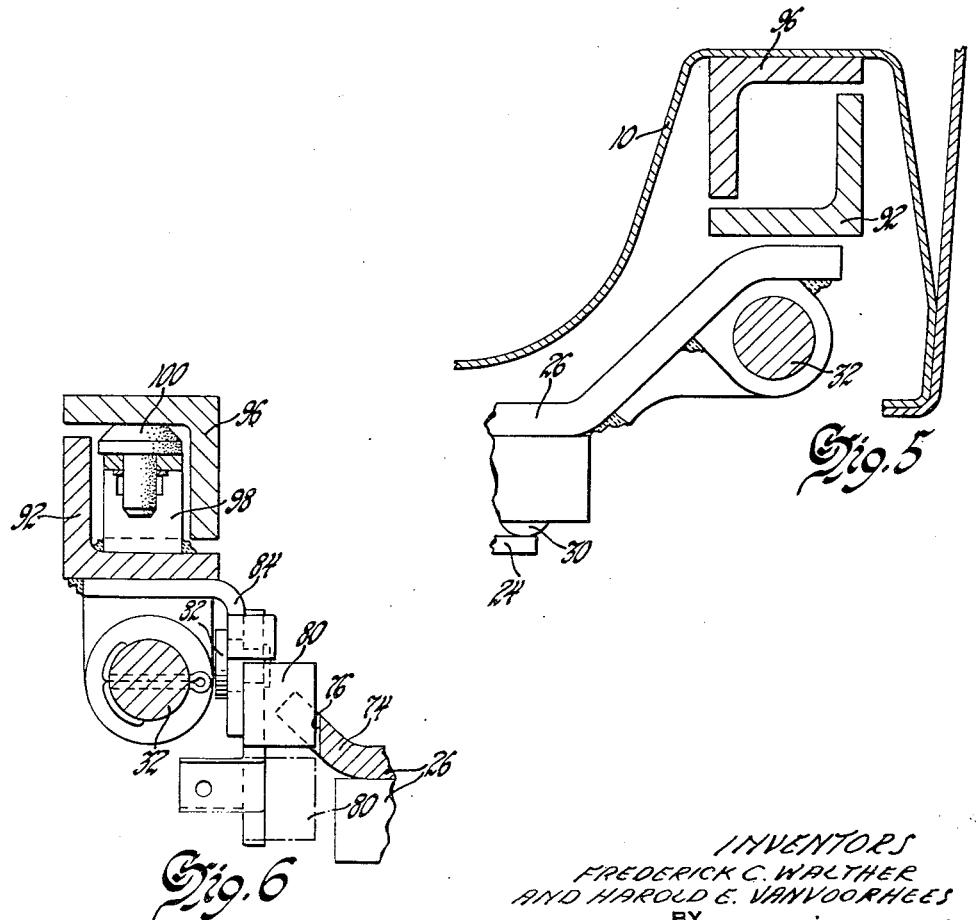

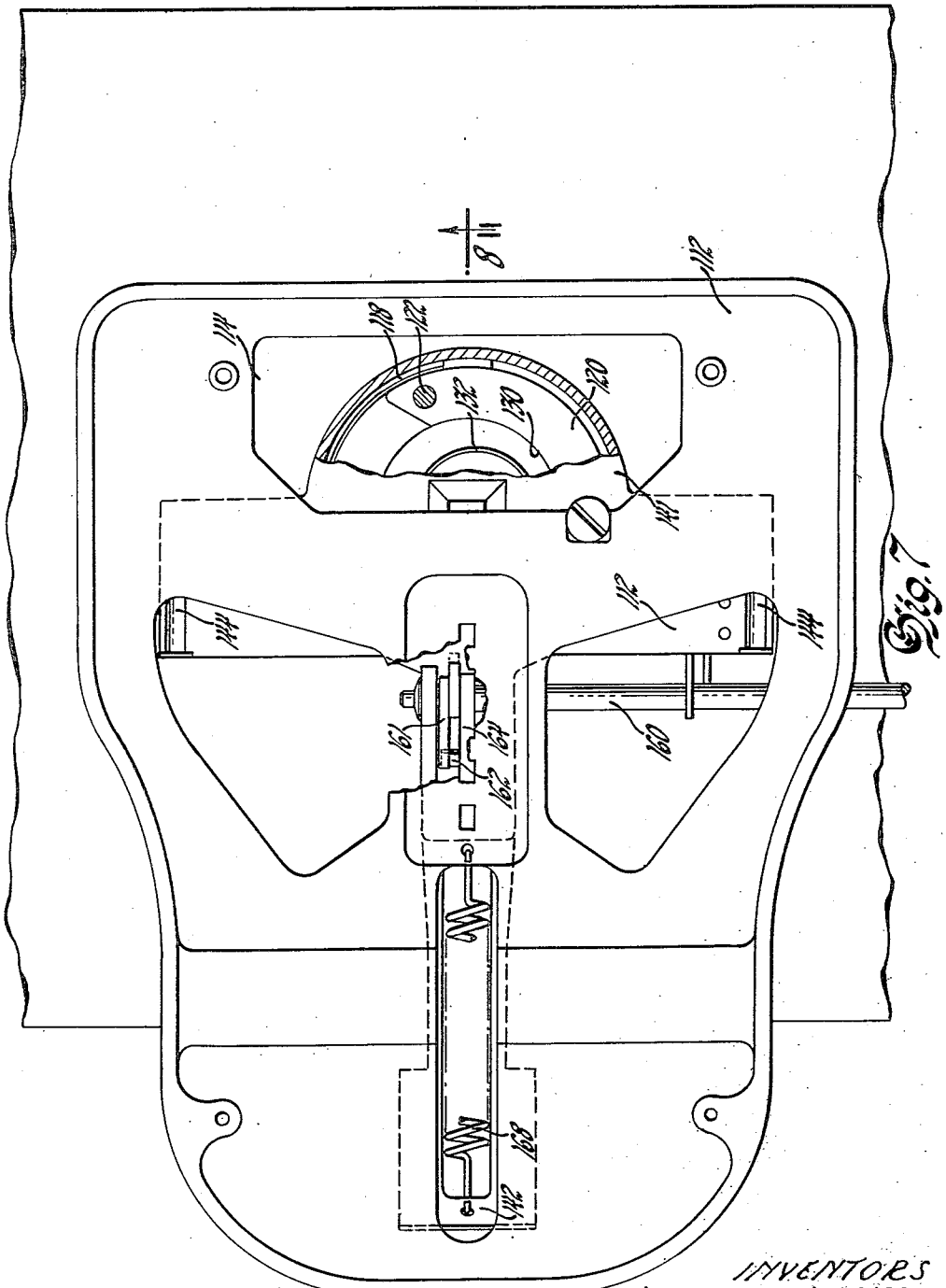

United States Patent Office 2,809,690
Patented Oct. 15, 1957

2,809,690

PIVOTED SEAT

Frederick C. Walther, Grosse Pointe, and Harold E. Van Voorhees, Grosse Pointe Woods, Mich., assignors to General Motors Corporation, Detroit, Mich., a corporation of Delaware Application January 19, 1954, Serial No. 404,847

12 Claims. (Cl. 155—14)

This invention relates to mounting means for a movable vehicle seat, and more particularly to mounting means for a pivoted seat for an automobile.

One feature of the invention is that it provides improved mounting means for a vehicle seat; another feature of the invention is that it provides a seat which is pivotally movable and which is also adjustable in fore and aft directions; a further feature of the invention is that it provides a seat which is pivotally movable, which may be adjusted in fore and aft directions, and which may be tilted forwardly to provide access to the space behind the seat back; another feature of the invention is that an inertia latch is provided to prevent undesired tilting movement of the seat; still another feature of the invention is that a single control means is provided for selectively pivoting the seat or adjusting it in fore and aft directions; and yet another feature of the invention is that it provides a novel seat and mounting means including a stationary floor support, a seat support pivotally mounted on the floor support and means for mounting a seat on the seat support including fore and aft adjusting means for moving the seat relative to both supports.

Other features and advantages of the invention will be apparent from the following description and from the drawings, in which:

Fig. 1 is a top plan view of the seat mounting means with the seat and its frame removed therefrom, parts being shown in solid lines in the normal forwardly facing position of the seat and in broken lines in a position wherein the seat is pivoted 90 degrees from its normal position;

Fig. 2 is a side elevational view of the seat mounting means, the seat frame being shown fragmentarily and the seat being shown in solid lines in its normal position and in broken lines in adjusted and tilted positions;

Figs. 3A and 3B, taken together, show a side elevational view of the seat mounting means, portions being broken away to show underlying structure;

Fig. 4 is a transverse section through a part of the seat mounting means and seat frame, being taken along the line 4—4 of Fig. 1;

Fig. 5 is a transverse section through a part of the seat mounting means and seat frame, being taken along the line 5—5 of Fig. 1;

Fig. 6 is a transverse section through a part of the seat mounting means, being taken along the line 6—6 of Fig. 1;

Fig. 7 is a plan view of a modified form of seat mounting means, parts being broken away in the seat mounting structure; and Fig. 8 is a longitudinal vertical section through the modified structure being taken along the line 8—8 of Fig. 7.

The seat illustrated is of the bucket type, and in the embodiment of the invention which is illustrated in Figs. 1 to 6 the seat is pivotal through an arc of 90 degrees, is adjustable in fore and aft directions and is tiltable forwardly to permit access to the space behind the seat back. First latch means are provided for latching the seat against pivotal movement to hold it in its normal position where it faces forwardly of the vehicle, and stop means are provided for limiting the pivotal movement of the seat to 90 degrees from its forwardly facing position. Second latch means are provided for holding the seat against fore and aft movement, and a single control device is arranged for selectively releasing either of said latch means.

Referring now more particularly to the drawings, the seat is a bucket seat carried in a frame 10 fragmentarily illustrated in Figs. 2, 4 and 5. The mounting means for the seat frame 10 comprises a floor support generally designated at 12 and including an upper plate member 14 and a lower member 16 secured together by rivets 18. As shown in Fig. 2, the floor support is stationary, being bolted to the floor 20 of the vehicle. The floor support plates are circular in plan as shown in Fig. 1, and the periphery of the upper member 14 is bent upwardly, as shown at 22 in Figs. 2 and 3, while the periphery of the lower member 16 is bent downwardly as shown at 24 to form a portion of a ball race. A seat support 26 comprises a plate formed with a center opening 25 (Fig. 1) slightly larger than the diameter of the circular floor support 12, and the periphery of this opening is formed with a complementary ball race portion 28, a plurality of anti-friction balls 30 being placed in the race between the supports 12 and 26 to provide an anti-friction mounting arrangement permitting pivotal movement of the seat support 26 on the stationary floor support.

The seat support 26 mounts cylindrical guides 32, one of these guides being located adjacent each opposite side of the seat, as shown in Fig. 1.

In order to hold the seat support 26 against pivotal movement, a latch is provided comprising an arm 34 pivotally mounted at its rear end on a pin 36 projecting downwardly from the support 26, and a pin and slot guide arrangement is shown at 38 for guiding and limiting movement of the latch arm 34. A latch lug 40 projects upwardly from an extension 41 on the floor support member 12 and engages a latch slot 42 in the arm 34, and a spring 44, which is connected between arm 34 and the seat support 26, urges the arm 34 in a clockwise direction as the parts are shown in Fig. 1 into engagement with the latch lug 40. At its forward end the arm 34 is formed with a transversely extending elongated slot 46 into which is hooked one end of a rod 48, the other end of the rod being articulated to one arm 50 of a bell crank lever which is pivoted at 51 on a bracket 52 projecting from the seat support 26. The other arm 54 of the release lever extends outwardly away from the seat and terminates in a gripping handle 56.

In solid lines Fig. 1 shows the seat latched in its normal forwardly facing position, the lug 40 engaging the notch 42 in arm 34. As appears from Fig. 1, the seat may be pivoted by releasing the latch, which may be done by moving the bell crank lever rearwardly or in a counterclockwise direction to pull down (as the parts appear in the drawing) on the forward end of arm 34. If the bell crank release lever is moved in a clockwise direction, it will have no effect on the arm 34, since a lost motion connection is made by the slot 46 into which the end of rod 48 is hooked. Assuming that the latch is released, the seat support 26 may be pivoted in a counterclockwise direction through an arc of 90 degrees to the position shown in broken lines in Fig. 1. Stop means are provided to limit the pivotal movement to 90 degrees, arm 34 having a turned flange 58 on its rear end which abuts a flange 60 bent from the extension 41 which projects from the stationary floor support 12. When the seat is pivoted back to its normal position, the flange 58 abuts a turned flange 62 on a bracket 64 projecting from the support 12.

In order to provide for horizontal fore and aft adjustment of the seat, the seat is slidably mounted on the two cylindrical guides 32 by means of spaced mounting brackets 66 which are secured to the channel 92. A compression spring 68 is carried on each cylindrical guide 32 and the forward end of the spring abuts a collar bracket 70 which depends from a part of the seat structure, while the rear end of the spring abuts a stationary collar 72 on the guide 32, so that the seat is constantly urged toward its forwardmost position.

A bracket 74 extends from plate 26, the bracket having a plurality of notches 76, and a latch lever 78 having a latch lug 80 at its rear end is pivotally mounted at 82 (Figs. 2 and 6) on a support 84 which depends from a part of the seat structure. Below and slightly rearwardly of the pivotal mounting point 82, bracket 78 is formed with an arcuate slot 86 in which is connected the rear end of an actuating rod 88, the front end of this rod being connected to arm 54 of the release lever. The slot 86 provides for lost motion so that operation of the release lever in one direction (counterclockwise as shown in Fig. 1) to release the seat for pivotal movement does not affect the fore and aft adjusting mechanism; however, operation of the release lever in the other direction, i. e., in a clockwise direction as the parts appear in Fig. 1, will pivot the latch lever 78 to move the latching lug 80 downwardly out of the notch in bracket 74. The seat now may be adjusted in fore and aft directions, spring 68 facilitating this adjustment in a forward direction and resiliently opposing this adjustment in a rearward direction. A spring 90 is connected to bracket 78 to urge the latch lug 80 upwardly into engagement with a selected notch. Fig. 2 shows the position of the seat mounting structure in solid lines in its rearmost position, and the structure is shown fragmentarily in broken lines in a forwardly adjusted position.

The seat 10 is mounted on the above described fore and aft adjusting means for tilting forward movement, as shown in broken lines in Fig. 2. At each side of the seat an L-shaped support channel 92 is welded or otherwise secured to the collar brackets 66 on the respective cylindrical guide 32, each channel 92 being movable with the seat in fore and aft directions as shown in broken lines in Fig. 2 and being pivotal therewith through an arc of 90 degrees as shown in broken lines in Fig. 1. At its forward end each support channel 92 is pivoted by a pin 94 to an inverted L-shaped seat support bracket 96 to which the seat frame 10 is secured. By virtue of this construction, the seat frame may be manually tilted from the normal horizontal position shown in Fig. 2 forwardly to a raised position as shown in broken lines in Fig. 2 to provide access to a package compartment or other space behind the seat. Adjacent the rear of the seat is a yoke 98 carrying a rubber bumper 100 upon which the inverted L-shaped channel 96 rests.

In order to prevent undesired tilting movement such as might occur in the event of a sudden stop, an inertia latch is provided comprising a hook 102 which is suspended in the manner of a pendulum for free pivotal movement upon a pin 104 on the inverted channel 96, and which will swing forward in the event of a sudden stop and engage a pin 106 to prevent undesired tilting movement.

Figs. 7 and 8 show a modified form of seat which is mounted for pivotal movement through an arc of 90 degrees and for fore and aft adjustment, but which is not tiltable forwardly as is the seat shown in Figs. 1 to 6.

In this modified construction, the seat is a bucket seat having a frame 110 secured to a support member 112. In order to mount the seat for pivotal movement, a floor support plate 114 is mounted on the vehicle floor 116, the support 114 having a circular wall 118 inside of which a rotatable bearing support 120 is mounted. A plurality of anti-friction balls 122 is carried in a race 124 between the top surface of support 114 and a groove in the lower surface of the rotatable support 120. A heavy stud 126 depending from the rotatable support 120 holds support 120 on the support 114 through a reinforcing plate 128, the stud clamping support 114 between the reinforcing plate 128 and the anti-friction balls 122. In its top surface member 120 is formed with a central recess 130 in which is located a helical spring 132, one end of the spring being connected in a slot 134 formed in a stud 136 fixedly mounted at the center of member 120 and the other end of the spring projecting through an opening in the wall of member 120 and being connected to the stationary wall 118 of floor support 114. When the seat is pivoted the spring is wound, and the seat is returned to its normal forwardly facing position under the force of the spring. Member 120 is provided with a plate support 140 including a cap 141, and a forwardly extending tongue 142. Seat support 112 is mounted for slidable fore and aft movement on plate 140 and tongue 142. At each side of the seat is a track 144 upon which support 112 slides on anti-friction balls 145, and a track 146 on tongue 142 slidably supports the front end of support 112 on balls 147. A block 148 which is welded to the upper surface of the cap 141 enters an elongated slot 150 in the member 112 to provide a stop for the fore and aft movement.

A slot 152 in the forward portion of stationary wall 118 is provided to receive a latch lug 153 which engages a latch slot 154 in rotatable bearing member 120 and prevents pivotal movement of the seat. In order to retract the latch, there is a one-way coupling lug 155 between lug 153 and an actuating lever 156 provided with a gripping knob 157. As appears from Fig. 8, movement of knob 157 in a direction of the seat will retract latch lug 153 from slot 154 and permit the seat to be pivoted, a projection 158 on the actuating lever 156 engaging lug 155 to move lug 153 out of the slot 154. A transverse rod 160 which provides a pivotal mounting for lever 156 extends from lever 156 to a point adjacent the center of the seat where a one-way connection is made through a lever arm 161 and a lug 162 with a second latch lever 164 which is adapted to engage a selected one of a plurality of notches 166 in seat support 112. Movement of the knob 157 in a direction forwardly of the seat will operate through this one-way connection to retract latch lever 164 from the notch and permit fore and aft adjustment of the seat. A spring 168 urges the seat forwardly when the fore and aft adjusting latch is released.

While we have shown and described two embodiments of our invention, it is capable of many modifications. Changes, therefore, in the construction and arrangement may be made without departing from the spirit and scope of the invention as set forth in the appended claims.

We claim:

1. A movable vehicle seat of the character described, including: a stationary floor support; a movable support pivotally mounted on said floor support; means for mounting a seat on said movable support including fore and aft adjusting means for moving the seat relative to both supports; first latch means for holding the seat against pivotal movement; second latch means for holding the seat against fore and aft movement on the movable support; and a single mechanical control device for selectively releasing either of said latch means, including a lever having a lost motion connection with each of said latch means.

2. A movable vehicle seat of the character described, including: a stationary floor support; a movable support pivotally mounted on said floor support; means for mounting a seat on said movable support, including fore and aft adjusting means for moving the seat relative to both supports; means for tilting the seat relative to both supports; and an inertia latch mounted on the seat and engageable with a keeper mounted on the means which mount the seat for preventing undesired tilting movement of said seat.

3. A movable vehicle seat of the character described, including: a stationary floor support; a movable support pivotally mounted on said floor support; mounting means on said movable support, including fore and aft adjusting means for moving the seat relative to both supports; a first longitudinal channel on said mounting means; a second channel overlying the first channel and articulated thereto at one end thereof; and a seat frame mounted on said second channel for tilting movement relative to said first channel and said supports.

4. A movable vehicle seat of the character described, including: a stationary floor support; a movable support pivotally mounted on said floor support; latch means for holding the movable support against pivotal movement on the floor support; mounting means on said movable support, including fore and aft adjusting means for moving the seat structure relative to both supports; a first longitudinal channel on said mounting means; a second channel overlying the first channel and articulated thereto at one end thereof; and a seat frame mounted on said second channel for tilting movement relative to said first channel and said supports.

5. A movable vehicle seat of the character described, including: a stationary floor support; a movable support pivotally mounted on said floor support; latch means for holding the movable support against pivotal movement on the floor support; mounting means on said movable support, including fore and aft adjusting means for moving the seat relative to both supports; latch means for holding the seat against fore and aft movement on the movable support; a single control device for selectively releasing either of said latch means; a first longitudinal channel on said mounting means; a second channel overlying the first channel and articulated thereto at one end thereof; and a seat frame mounted on said second channel for tilting movement relative to said first channel and said supports.

6. A movable vehicle seat of the character described, including: a stationary floor support; a movable support pivotally mounted on said floor support; anti-friction means between said supports; mounting means on said movable support, including fore and aft adjusting means for moving the seat relative to both supports; a first latch device for holding the movable support against pivotal movement; stop means for limiting the degree of pivotal movement of said movable support when the latch is released; a second latch device for holding the seat against fore and aft movement on the movable support; a single control device for selectively releasing either of said latch devices; a first longitudinal channel on said mounting means; a second channel overlying the first channel and articulated thereto at the front end thereof; and a seat frame mounted on said second channel for tilting movement relative to said first channel and said supports.

7. A movable vehicle seat of the character described, including: a stationary floor support; a movable support pivotally mounted on said floor support; anti-friction means between said supports; mounting means on said movable support, including fore and aft adjusting means for moving the seat relative to both supports; a first latch device for holding the movable support against pivotal movement; stop means for limiting the degree of pivotal movement of said movable support when the latch is released; a second latch device for holding the seat against fore and aft movement on the movable support; a single control device for selectively releasing either of said latch means; a first longitudinal channel on said mounting means; a second channel overlying the first channel and articulated thereto at one end thereof; a seat frame mounted on said second channel for forward tilting movement relative to said first channel and said supports; and an inertia latch mounted on said second channel and engageable with a keeper mounted on said first channel for preventing undesired tilting movement of said seat.

8. A movable vehicle seat of the character described, including: a stationary floor support; a movable support pivotally mounted on said floor support; means for mounting a seat on said movable support, including fore and aft adjusting means for moving the seat relative to both supports; and a combination latch device comprising first latch means for holding the seat against pivotal movement, second latch means for holding the seat against fore and aft movemement on the movable support, lost motion coupling means interconnecting said first and second latch means, and a single control device for operating said coupling means for selectively releasing either of said latch means.

9. A movable vehicle seat of the character described, including: a stationary floor support having a circular ball race thereon; a movable support on said stationary support, the movable support having a complementary ball race thereon; a plurality of balls in said races between said supports pivotally mounting the movable support on the floor support; means for mounting a seat on said movable support, including fore and aft adjusting means for moving the seat relative to both supports; and a combination latch device comprising first latch means for holding the seat against pivotal movement, second latch means for holding the seat against fore and aft movement on the movable support, lost motion coupling means interconnecting said first and second latch means, and a single control device for operating said coupling means for selectively releasing either of said latch means.

10. A movable vehicle seat of the character described, including: a stationary floor support; a movable support pivotally mounted on said floor support; means for mounting a seat on said movable support, including fore and aft adjusting means for moving the seat relative to both supports; means for tilting the seat relative to both supports; and a combination latch device comprising first latch means for holding the seat against pivotal movement, second latch means for holding the seat against fore and aft movement on the movable support, lost motion coupling means interconnecting said first and second latch means, and a single control device for operating said coupling means for selectively releasing either of said latch means.

11. Apparatus of the character claimed in claim 8, wherein said movable support is formed with a recess and a spring is seated in the recess and connected between the stationary support and the movable support, said spring urging the seat toward its normal forwardly facing position.

12. Apparatus of the character claimed in claim 9, wherein said movable support is formed with a recess and a helical spring is seated in the recess and has one end connected to the stationary support and the other end connected to the movable support, the spring urging the seat toward its normal forwardly facing position.

References Cited in the file of this patent
UNITED STATES PATENTS

| | | |
|---|---|---|
| 1,470,004 | Gahm | Oct. 9, 1923 |
| 1,746,986 | Bell | Feb. 11, 1930 |
| 2,290,464 | Buchheit | July 21, 1942 |
| 2,576,004 | Fair | Nov. 20, 1951 |
| 2,584,184 | Brown | Feb. 5, 1952 |